United States Patent
Esswie

(10) Patent No.: US 12,490,307 B2
(45) Date of Patent: Dec. 2, 2025

(54) SIDELINK CONTROL CHANNEL SENSING

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 705 days.

(21) Appl. No.: 17/866,245

(22) Filed: Jul. 15, 2022

(65) Prior Publication Data
US 2024/0023162 A1    Jan. 18, 2024

(51) Int. Cl.
*H04W 74/0816*    (2024.01)
*H04W 28/26*    (2009.01)
*H04W 74/08*    (2009.01)

(52) U.S. Cl.
CPC ....... *H04W 74/0816* (2013.01); *H04W 28/26* (2013.01); *H04W 74/0866* (2013.01)

(58) Field of Classification Search
CPC ......... H04W 74/0816; H04W 74/0866; H04W 28/26; H04W 72/25; H04W 72/02
USPC ................. 370/329, 252, 332, 311
See application file for complete search history.

(56) References Cited

U.S. PATENT DOCUMENTS

| | | | |
|---|---|---|---|
| 2021/0392547 A1* | 12/2021 | Tang | H04W 28/16 |
| 2022/0256591 A1* | 8/2022 | Wang | H04W 74/002 |
| 2022/0295552 A1* | 9/2022 | Shin | H04W 72/02 |
| 2023/0092224 A1* | 3/2023 | Mohammad Soleymani | H04W 72/56 370/329 |
| 2023/0239834 A1* | 7/2023 | Ye | H04W 68/02 455/458 |
| 2023/0328693 A1* | 10/2023 | Ryu | H04B 7/0695 370/329 |

OTHER PUBLICATIONS

Technical specifications (TS) 38.201—"5G; NR; Physical layer; General description", 3GPP TS 38.201 version 15.0.0 Release 15, Sep. 2018, 14 pages.

(Continued)

*Primary Examiner* — Ricardo H Castaneyra
(74) *Attorney, Agent, or Firm* — Amin, Turocy & Watson, LLP

(57) ABSTRACT

Sidelink relay and remote sidelink devices of a sidelink group negotiate a distributed sidelink control channel sensing arrangement such that one sidelink device monitors control channel sensing occasions during a configured sensing period corresponding to the monitoring sielink device while other members of the group sleep their respective control channel sensing circuitry. More than one member of the group may be awake during a configured channel sensing reporting occasion that is used to communicate available channel resource reports among group members. A report may be unicast, multicast, or broadcast, and may be transmitted in a SCI. Group members may be configured to transmit or receive an interruption request that requests by a non-sensing member a partial available channel resource report from a group member that is currently sensing. The partial report may be transmitted before the configured reporting occasion.

20 Claims, 13 Drawing Sheets

(56) References Cited

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.

\* cited by examiner

| 510 | 515 |
|---|---|
| Chanel resource entry/record | Free channel resource information |
| Xxx_1 | Start slot/symbol, length of free channel resource (time/slots/subframes, symbols), and frequency resources (subchannel IDs, PRB indices, resource pool indices). |
| : | : |
| : | : |
| Xxx_n | : |

| CBR_1 | CBR_2 | CBR_3 | CBR_4 | ... | ... | CBR_n |
|---|---|---|---|---|---|---|

517

| 520 | 525 |
|---|---|
| Chanel resource entry/record | Free channel resource information |
| Xxx_1 | Start slot/symbol, length of free channel resource (time/slots/subframes, symbols), and frequency resources (subchannel IDs, PRB indices, resource pool indices). |
| : | : |
| : | : |
| Xxx_n | : |
| Filtered CBR | |

527

```
┌─────────────────────────────────────────────────────────────┐
│   A non-transitory machine-readable medium, comprising      │
│   executable instructions that, when executed by a          │
│   processor of a first user equipment of a wireless         │
│   sidelink communication zone group of user equipment in    │
│   a wireless communication network, facilitate performance  │
│   of operations, comprising: negotiating, by at least one   │
│   user equipment of the wireless sidelink communication     │
│   zone group, a shared sidelink control channel sensing     │
│   procedure, wherein the shared sidelink control channel    │
│   sensing procedure comprises implementing user             │
│   equipment-specific sensing periods corresponding to the   │
│   wireless sidelink communication zone group of user        │
│   equipment                                                 │
└─────────────────────────────────────────────────────────────┘
                              ↓ 1305
┌─────────────────────────────────────────────────────────────┐
│   decoding, by the first user equipment of the wireless     │
│   sidelink communication zone group and according to the    │
│   shared sidelink control channel sensing procedure,        │
│   sensing instants during a user equipment-specific         │
│   sensing period that corresponds to the first user         │
│   equipment to result in decoded sensing instants           │
└─────────────────────────────────────────────────────────────┘
                              ↓ 1310              1300
┌─────────────────────────────────────────────────────────────┐
│   determining, from the decoded sensing instants and with   │
│   the first user equipment, indications of occupied         │
│   sidelink channel resources that are reserved for use by   │
│   the at least one user equipment of the wireless sidelink  │
│   communication zone group for transmitting a sidelink      │
│   payload and indications of available sidelink channel     │
│   resources that are available for transmitting the         │
│   sidelink payload by the user equipment s of the wireless  │
│   sidelink communication zone group                         │
└─────────────────────────────────────────────────────────────┘
                              ↓ 1315
┌─────────────────────────────────────────────────────────────┐
│   wherein the operations further comprise receiving, with   │
│   the first user equipment, a request from a second user    │
│   equipment for an available sidelink channel resource      │
│   report during the user equipment-specific sensing period  │
│   corresponding to the first user equipment                 │
└─────────────────────────────────────────────────────────────┘
                              ↓ 1320
┌─────────────────────────────────────────────────────────────┐
│   wherein the shared sidelink control channel sensing       │
│   procedure comprises a configured available channel        │
│   resource report occasion, and wherein the operations      │
│   further comprise transmitting, with the first user        │
│   equipment, the available channel resource report during   │
│   the configured available channel resource report occasion │
└─────────────────────────────────────────────────────────────┘
                                                 1325
```

SIDELINK CONTROL CHANNEL SENSING

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Sidelink communications may facilitate a variety of cellular use-cases such as autonomous vehicle crash avoidance, public avoidance, coordinated vehicle cruise control, and the like, where devices become able to communicate and coordinate directly with each other without communication messaging and signaling going through the RAN network. This is particularly important in cases where some of or all user equipment that coordinate as part of a sidelink group are located beyond RAN wireless coverage. In scenarios where user equipment are beyond RAN coverage, the RAN nodes may control how sidelink resources are dynamically reserved and released for each device to prevent more than one user equipment of a sidelink group transmitting simultaneously on partially or fully overlapping sidelink resource to avoid transmission collision.

User equipment perform channel sensing before making a sidelink transmission, where they monitor and blindly decode channel reservations for other sidelink devices in proximity. Accordingly, for its own transmission, and based on channel sensing results, a user equipment selects free resources to use for the transmission. Channel sensing contributes significantly to power inefficient operation (channel sensing is the primary factor that drains user equipment's battery charge) due to the frequent blind decoding performed at all sidelink devices. For user equipment performing sidelink relay functions, where additional power burden is imposed due to performing the relaying of control and data transmissions of remote sidelink devices, power use due to performing relaying functions in addition to channel sensing is an even bigger concern.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method may comprise, in a wireless communication network comprising user equipment members of a wireless sidelink communication zone group, negotiating, by one or more members of the wireless sidelink communication zone group, a shared sidelink control channel sensing scheme, wherein the shared sidelink control channel sensing scheme comprises member-specific sensing periods corresponding to the user equipment group members; decoding, by a first member of the wireless sidelink communication zone group and according to the shared sidelink control channel sensing scheme, sensing instants during a member-specific sensing period that corresponds to the first member, the decoding resulting in a decoded sensing instants; and determining, from the decoded sensing instants and with the first member, indications of occupied sidelink channel resources that are reserved for use by the one or more members of the wireless sidelink communication zone group for transmission of a sidelink payload and indications of available sidelink channel resources that are available for the transmission of the sidelink payload by the user equipment members of the wireless sidelink communication zone group. The term 'available' in reference to sidelink channel resources may be used interchangeably with the term 'free.' The embodiment method may further comprise transmitting, with the first member, payload data corresponding to the first member using an available sidelink channel resource. The payload data may comprise packets of a data flow destined for a member of the group other than the first member. Ones (one or more members) of the user equipment members of the wireless sidelink communication zone group other than the first member may be in an inactive mode (e.g., not currently performing channel sensing according to the distributed channel sensing scheme) during the member-specific sensing period corresponding to the first member. The in active mode may be a deep sleep mode, or other mode where channel sensing circuitry of the inactive devices is not consuming power to monitor channel resource instants, thus minimizing power consumption while the first UE is monitoring, or sensing, control channel instants.

The shared sidelink control channel sensing scheme, which may be referred to as a distributed control channel sensing scheme, may comprise a configured available channel resource report occasion, and the example embodiment method may further comprise transmitting, with the first member, an available/free channel resource report during the configured available channel resource report occasion. The configured available channel resource report may be configured to occur during a control channel sensing instant, but instead of only the first UE sensing control channel instants, one or more other members of the group may activate their respective sensing circuitry during the available/free channel resource report occasion to receive and decode the free channel resource report and information contained therein, and after doing so return their respective sensing circuitry to an inactive mode, unless it is the turn of one of the one or more other UEs to begin its respective sensing period of the distributed, or shared, control channel sensing scheme.

The example method may further comprise transmitting, with the first member, an available channel resource report as payload data of a sidelink transmission.

The example embodiment method may further comprise receiving, with the first member, a request from a second member for an available sidelink channel resource report during the member-specific sensing period corresponding to the first member. This scenario may occur when the second member received payload for a member of the group that has a latency-stringent requirement of a very low latency, such as for example, an URLLC or mission critical communication. The request received from the second member may comprise an interruption request. The interruption request may request that the currently-sensing UE interrupt sensing according to the configured distributed channel sensing scheme to provide a partial free channel resource report to the requesting UE, thus prempting, and least partially, channel sensing by the currently-sensing UE. The shared sidelink control channel sensing scheme may comprise a configured available channel resource report occasion, and the method may further comprise transmitting, with the first member, the available channel resource report during the configured available channel resource report occasion during which, or at which, the currently-sensing UE may provide a full free channel resource report at a next configured occasion for transmitting a full free channel resource report. Alternatively, the currently sensing UE may transmit the available channel resource report as payload data of a sidelink transmission.

The example embodiment method may further comprise entering an inactive mode (e.g., non-channel sensing) by the first member upon an expiration of the member-specific sensing period that corresponds to the first member.

In an example embodiment, a user equipment may comprise a processor to: negotiate, with one or more user equipment of a group of user equipment, a shared sidelink control channel sensing protocol (which may comprise a shared, or distributed, channel sensing scheme, or distributed channel sensing pattern), wherein the shared sidelink control channel sensing protocol comprises member-specific sensing periods corresponding to the group of user equipment; decode, according to the shared sidelink control channel sensing protocol, sensing instants during a user equipment-specific sensing period that corresponds to the first user equipment to result in decoded sensing instants; and determine, from the decoded sensing instants, indications of occupied sidelink channel resources that are reserved for use, by the one or more user equipment of the group, to transmit a sidelink payload and indications of available sidelink channel resources that are available for use to transmit the sidelink payload by the group of user equipment. The processor may be further configured to transmit payload data corresponding to the first user equipment using an available sidelink channel resource. Other user equipment of the group other than the first user equipment may be in an inactive mode (e.g., non-channel sensing) during the user equipment-specific sensing period corresponding to the first user equipment. The shared sidelink control channel sensing protocol may comprise a configured available channel resource report occasion, and wherein the processor is further configured to transmit, with the first user equipment, an available channel resource report during the configured available channel resource report occasion. The processor may be further configured to transmit, with the first user equipment, an available channel resource report as payload data of a sidelink transmission.

In an aspect, the shared sidelink control channel sensing protocol may comprise a configured available channel resource report occasion, and the processor may be further configured to receive a request from a second user equipment for an available sidelink channel resource report during the user equipment-specific sensing period corresponding to the first user equipment; and transmit the available channel resource report during the configured available channel resource report occasion.

An example non-transitory machine-readable medium embodiment may comprise executable instructions that, when executed by a processor of a first user equipment of a wireless sidelink communication zone group of user equipment in a wireless communication network, facilitate performance of operations, comprising: negotiating, by at least one user equipment of the wireless sidelink communication zone group, a shared sidelink control channel sensing procedure, wherein the shared sidelink control channel sensing procedure comprises implementing user equipment-specific sensing periods corresponding to the wireless sidelink communication zone group of user equipment; decoding, by the first user equipment of the wireless sidelink communication zone group and according to the shared sidelink control channel sensing procedure, sensing instants during a user equipment-specific sensing period that corresponds to the first user equipment to result in decoded sensing instants; and determining, from the decoded sensing instants and with the first user equipment, indications of occupied sidelink channel resources that are reserved for use by the at least one user equipment of the wireless sidelink communication zone group for transmitting a sidelink payload and indications of available sidelink channel resources that are available for transmitting the sidelink payload by the user equipment s of the wireless sidelink communication zone group. The operations may further comprise sleeping, during another user equipment-specific sensing period corresponding to another user equipment of the wireless sidelink communication zone group other than the first user equipment. The shared, or distributed, sidelink control channel sensing procedure may comprise a configured available channel resource report occasion, and the operations may further comprise transmitting, with the first user equipment, an available channel resource report during the configured available channel resource report occasion.

In an aspect the operations may further comprise receiving, with the first user equipment, a request from a second user equipment for an available sidelink channel resource report during the user equipment-specific sensing period corresponding to the first user equipment. The shared sidelink control channel sensing procedure may comprise a configured available channel resource report occasion, and wherein the operations further comprise transmitting, with the first user equipment, the available channel resource report during the configured available channel resource report occasion.

BRIEF DESCRIPTION OF THE DRAWINGS

FIG. 5A illustrates example contents and structure of a free channel resource report.

FIG. 5B illustrates example contents and structure of a free channel resource report filtered for a channel busy ratio value.

FIG. 13 illustrates a block diagram of an example non-transitory machine-readable medium embodiment.

DETAILED DESCRIPTION OF THE DRAWINGS

Figure 1:
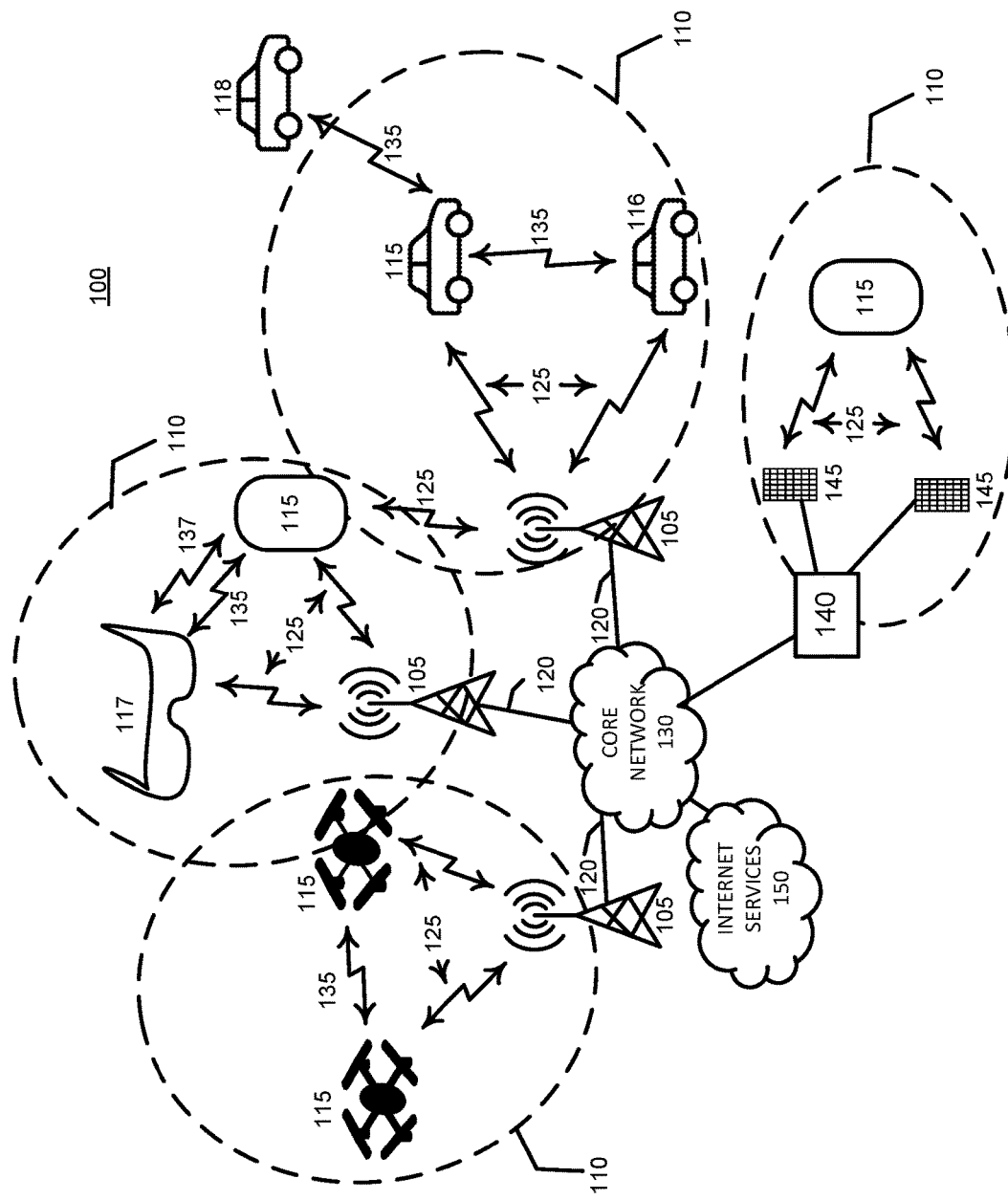
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Sidelink communications refers to cellular devices communicating with each other directly, without having to go through a serving RAN node, by establishing a sidelink communication link. However, a RAN node may or may not control how sidelink resources are being reserved and dictated by different sidelink devices. In one sidelink radio resource management option, sidelink devices are configured to always request a sidelink resource towards another sidelink device from the serving RAN node. This requires that at least, the transmitting sidelink node to be within the coverage of the serving node. Furthermore, the sidelink-experienced communication latency clearly increases due to the additional transmission of the RAN scheduling request and reception of the corresponding scheduling grant before the sidelink scheduling and transmission are triggered. Advantageously, this reduces the possibility of sidelink channel collisions.

In another radio resource management option, sidelink devices are configured to autonomously sense the sidelink channel resources, determine which sidelink resource are reserved for other devices' sidelink transmissions, and determine which resource set is free/available for their own transmission. The channel sensing rules and high-level channel sensing configurations are indicated from the RAN network. Therefore, the sidelink control channel has been designed to support efficient channel sensing over the sidelink interface. In particular, the sidelink control channel is designed in a two-stage format. The first stage carries a first stage sidelink control information ("SCI") and the second stage carries a second stage SCI.

The first stage SCI is similar to the RAN downlink control information ("DCI") and may carry the following information elements: scheduling information of a reserved data resource for a sidelink transmission of interest, and scheduling resource information of the second stage SCI that carries the transmission-specific configuration of the sidelink data channels.

Accordingly, sidelink devices attempt blindly decoding of the first stage SCI to determine which sidelink data resource will be reserved by which sidelink device in proximity. However, the sensing sidelink device cannot determine whether an actual sidelink data payload is destined for it, thus a sidelink device decodes the second stage SCI. The second stage SCI carries the following information elements: source device and destination device identifiers of the sidelink transmission, and sidelink transmission configurations including modulation schemes, coding schemes, and HARQ feedback information.

Therefore, a sidelink device monitors and blindly decodes the first stage SCI to determine the reserved channel resources for the associated sidelink transmission, determines transmission configurations of the second stage SCI, and decodes the second stage SCI to determine if a corresponding sidelink transmission is destined for it. If a sidelink device is a transmit-only device (e.g., an M2M device), the device only receives and blindly decodes the first stage SCI, while skipping decoding of the second stage SCI, in which case channel sensing may only comprise monitoring, detection, and blind decoding of the first stage SCI.

There are two modes of channel sensing. First, continuous channel sensing may be configured such that a control channel of the sidelink interface signaling can flexibly be placed at any time instant such that a sensing sidelink device can always search and monitor for a control channel that is carrying the first stage SCI. Second, and due to the significant power consumption burden of the continuous sensing, a partial channel sensing procedure may be implemented, such that the sidelink control channel is configured to be periodically, or non-periodically, transmitted during predefined time instants, and accordingly, a sensing sidelink device may only monitor and blindly decode those timing and frequency instants while possibly deep sleeping otherwise.

Sidelink relays are sidelink devices that are performing sidelink and RAN functions on behalf of, or for the sake of, other remote sidelink devices in proximity to the sidelink relay. Sidelink relays offers a wide set of sidelink functions for remote sidelink devices including channel granting, multi-hop traffic relaying, or paging monitoring. Thus, less capable sidelink remote devices obtain several performance advantages such as power saving gains, and sidelink and RAN network coverage extension. Accordingly, there are two modes which a sidelink relay device may adopt for announcing their presence for remote devices in proximity.

In one variant, sidelink relays explicitly announce their presence using a preconfigured discovery procedure. During the configured discovery period, sidelink relay broadcasts an announcement message that indicates their presence and their associated relaying configurations. Remote devices receive a relay's discovery messages and, upon interest in becoming part of, or a member of, a sidelink zone, or group, that includes the relay, initiate a direct communication link with the sidelink relay.

In another discovery variant, a sidelink remote device proactively transmits a discovery message requesting that sidelink relays in proximity announce their presence and corresponding relaying services. This option offers the advantage of the on-demand discovery signaling where sidelink relays avoid transmitting unnecessary discovery messages that may not be utilized by present remote devices in proximity.

Layer-2 relaying denotes that the end-to-end protocol stack and QoS targets over sidelink interface will not be interrupted at the relay, e.g., the relay alters lower layer headers to perform traffic relaying. Thus, with layer-2 relays, the end-to-end QoS and flows can be tracked and maintained. However, for layer-3 relaying, the end-to-end QoS is lost at the relay side because the latter alters and translates the original QoS flows metrics to corresponding relay-specific metrics.

Sidelink DRX cycle and channel partial sensing partially address the issue of device battery consumption. A sidelink device is configured with a DRX cycle that consists of a period of monitoring control channels to determine if there is a scheduled sidelink reception, and a period of deep sleeping such that power consumption of the sidelink device is optimized. Unlike RAN DRX procedures, sidelink inter-device coordination procedures must be in place for sidelink DRX, due to the distributed nature of the sidelink interface. For example, a sidelink device my transmit a sidelink scheduling information towards another sidelink device in proximity that is currently deep sleeping, leading to the sleeping device missing the detection of the scheduling information, and accordingly, increasing the sidelink transmission latency. Thus, sidelink devices in proximity coordinate on DRX cycles that are common at least between device pairs of interest.

Regarding partial channel sensing, sidelink devices implementing continuous channel sensing have the ability to always monitor sidelink control channels for potential scheduled transmissions, which results in significant battery power consumption due to the frequent blind decoding attempts. With partial channel sensing and sidelink DRX, the scheduling of the control channel is preconfigured during certain periodic occasion that sidelink devices expect to perform channel sensing. Thus, partial channel sensing enables sidelink devices to deep sleep over extended periods of time, even during a sidelink DRX channel wake period.

However, due to the functionality that the sidelink relays perform, power consumption is exacerbated for sidelink relays compared to non-sidelink-realyUE. That is, a sidelink relay performs RAN-like procedures as well as sidelink functions for the relay device itself and its connected remote sidelink devices, leading to significant battery consumption. A sidelink relay relays traffic and performs RAN/sidelink functions on behalf of the connected remote sidelink devices. A sidelink relay may monitor and decode RAN/sidelink paging on behalf of remote devices. The higher the number of remote devices that are connected to the relay as part of a sidelink group, or zone, the more the number of paging occasions the sidelink relay monitors, detects, and decodes, which consumes battery power of the sidelink relay at a high rate. In addition, a sidelink relay may perform sidelink routing and relaying of traffic towards not-in-RAN-coverage sidelink devices. A sidelink relay device may also perform continuous and/or partial channel sensing on behalf of connected in-coverage remote sidelink devices. Such upgraded, or additional, functionality of sidelink relay devices introduces a power consumption limitation at the device end. Thus, power saving optimization procedures are desirable to enhance battery charge/energy availability at battery powered sidelink relays. Accordingly, novel and non-obvious embodiments, aspects, concepts, and features disclosed herein are directed to minimizing battery power consumption of user equipment in sidelink groups, including minimizing power consumption of a sidelink relay, which power consumption may be higher than power consumption of remote sidelink user equipment members of a sidelink group due to the sidelink relay performing sidelink functions as well as RAN functions for connected remote sidelink devices.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB s)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
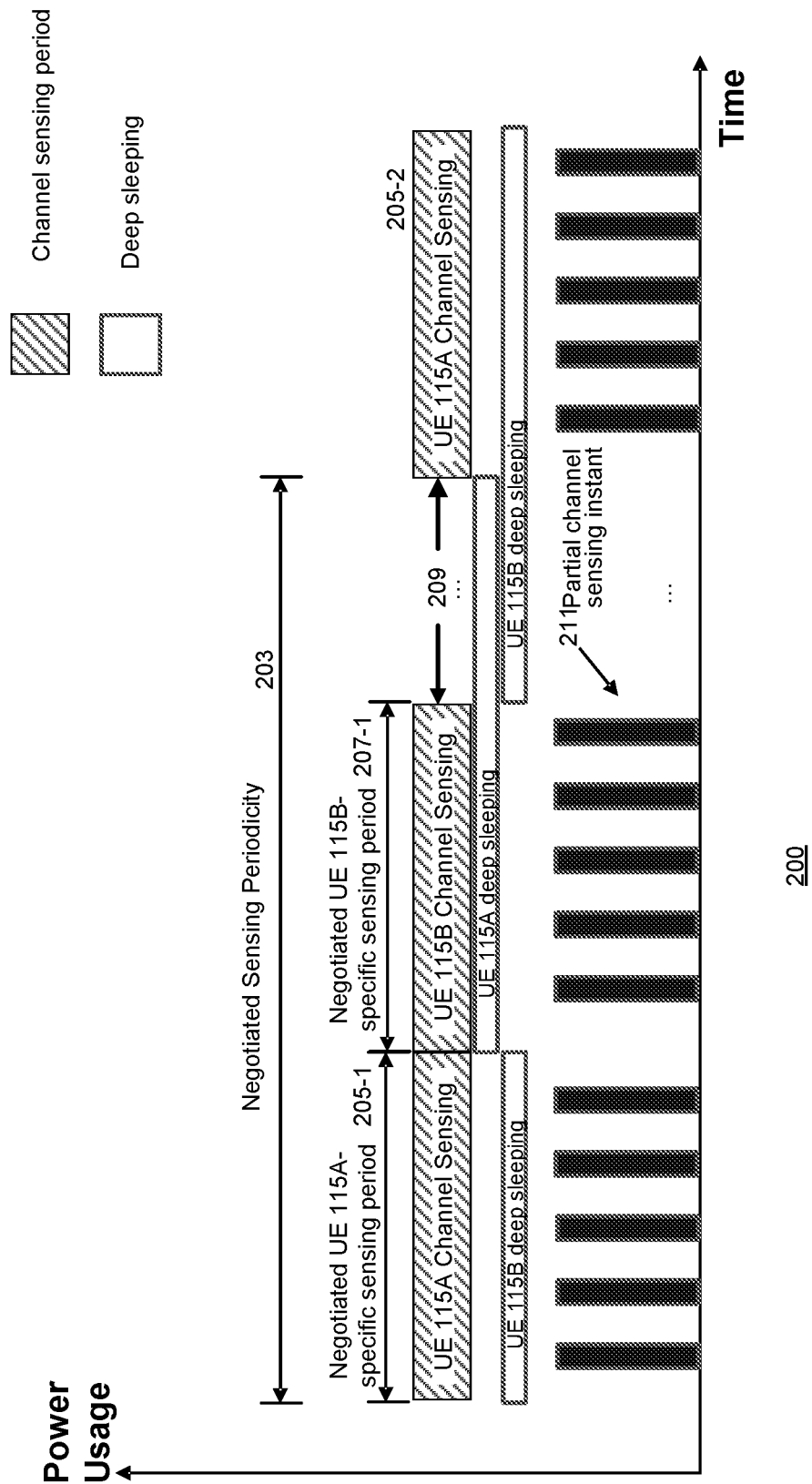
FIG. 2 illustrates a diagram of an example embodiment of dynamic distributed sidelink channel sensing.

Turning now to FIG. 2, the figure illustrates a diagram of an example embodiment 200 of dynamic distributed sidelink channel sensing. Sidelink relays and/or sidelink devices may negotiate a distributed sidelink control channel sensing arrangement that may comprise a periodicity 203, a device-specific period 205 for a first UE 115A to monitor a side link control channel and a device specific period 207 for a second UE 115B to monitor the sidelink control channel. It will be appreciated that after period 203, the negotiated arrangement may comprise repeating sensing periods 205, 207, and common deep sleep period 209. Alternatively, period 205 may repeat the first period 205-1 as period 205-2, as shown in the figure but other patterns, or schemes, of sleep periods or sensing periods of UE 115B and of period 207 and period 209 may be configured. As shown in the figure, sidelink UE 115A and sidelink 115B take turns deep sleeping while the UE not deep sleeping performs channel sensing of configured control channel sensing occasions. UE 115A performs channel sensing during period 205 and UE 115B performs channel sensing during period 207. Sidelink devices and/or sidelink relay device may monitor and decode all of, or fewer than all of, channel sensing instants/occasions 211 during a configured channel sensing period corresponding to the device and according to negotiated periodicity 203 periodicity. The negotiating may comprise devices of a sidelink group determining to distribute channel sensing, and the concomitant device power burden, based on dynamic/changing conditions, such as energy charge stored in batteries of the corresponding devices.

As a device's battery charge level changes, it can report its battery charge level to other devices in the group, or to the sidelink relay device, and if a given device's battery has fallen relative to battery levels of other device of the group, the sleep period during period 203 of the given device may be increased thus resulting in a reduced number of channel sensing occasions 211 that the device wakes up to monitor and decode. As the members of a sidelink group change (e.g., due to mobility of device such as in a scenario where a sidelink group comprises vehicle-to-vehicle user equipment, new members become part of the group or existing members leave the group) sidelink devices of limited battery power capability may dynamically assume a smaller part of the channel sensing or completely skip channel sensing while sidelink devices of a better battery capability assume a larger portion of the channel sensing burden.

Information elements of the proposed sidelink distributed control channel may comprise a starting time instant of channel sensing share, a length or period of a distributed channel sensing share, a distributed channel sensing periodicity, a validity period of the negotiated channel sensing configuration, or criteria for admitting new members to a group of sidelink devices that have negotiated the shared, or distributed, channel sensing duties. A starting time of and instant of channel sensing sharing may comprise an explicit system timing, a RAN system frame number, a sidelink direct frame number including the slot and/or subframe and/or symbol indications of the respective starting frame. A Length or period of the distributed channel sensing share may comprise a timer, starting from the configured starting time instant, a number of frames, slots, subframes, or Orthagonal frequency division multiplexing symbols. A Distributed channel sensing periodicity may comprise a value that indicates a time periodicity from the current channel sensing period to the next configured one, and/or a number of SFNs, direct frame numbers ("DFN"), slots and/or symbols. A validity period of the current channel sensing configurations may comprise a timing information, or value, that indicates an active period of the current distributed channel sensing, to coordination sidelink devices. The validity period can comprise an explicit timing period or an indication of multiple numbers of either accepted sensing period or sensing periodicity. After the configured channel sensing validity period expires, the sidelink devices of a sidelink group may flush the negotiated configurations of the distributed channel sensing and revert to monitoring and blindly decoding all configured original channel sensing instants, if distributed channel sensing is not further active within the associated sensing zone, or group.

In an embodiment, a WTRU/UE may transmit to WTRU/UEs in proximity that have met certain configured coverage threshold criteria, an indication of support for distributed channel sensing, and associated sensing configurations, as part of discovery or direct communication signaling. The indication of support for distributed channel sensing may comprise a starting time instant (direct frame number or slot index or subframe index), length or time period of distributed channel sensing, a timer from the indicated start time instant or number of time instants of frames, subframes, slots, or channel sensing periodicity, or a validity period over which distributed channel sensing is activated. The UE may receive proposed/recommended distributed channel sensing configuration(s), that may comprise an offset of the distributed channel sensing start time/DFN or an adjusted periodicity or adjusted length of the distributed channel sensing time share. The UE may transmit an acceptance indicating acceptance of the proposed distributed channel sensing configuration share assigned to the UE. The UE may overwrite, or at least disregard for the distributed channel sensing validity period, configured channel sensing configurations with the accepted distributed channel sensing configuration (s). The UE may then monitor and blindly decoding control channels over the accepted channel sensing validity period, but may enter a deep sleep mode and may skip monitoring and blindly decoding control sensing channels outside of a configured partial sensing period assigned to the UE until the next distributed sensing opportunity. On condition that the configured distributed channel sensing validity period expires, the UE may resume monitoring and blindly decoding previously configured channel sensing instants.

Figure 3:
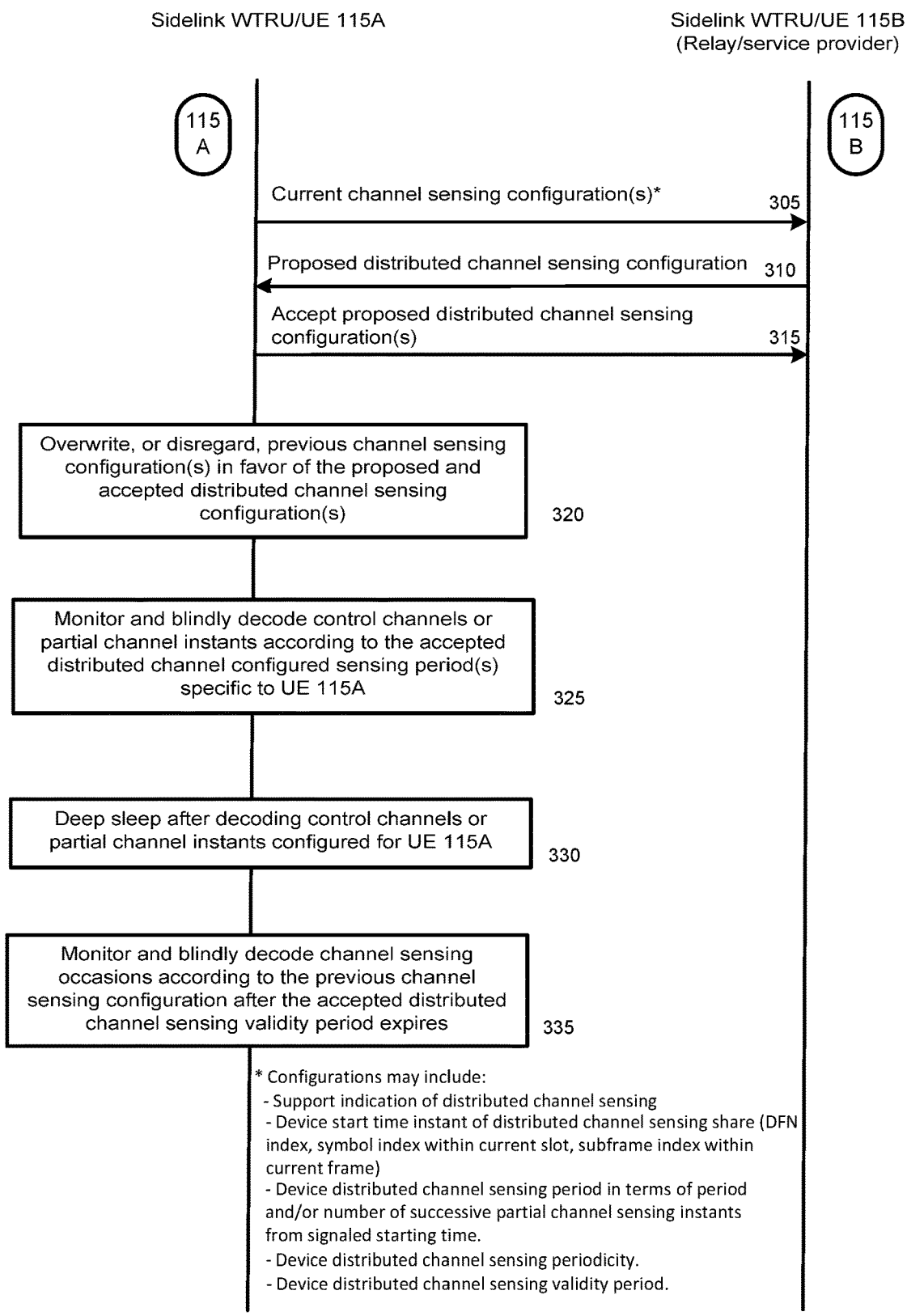
FIG. 3 illustrates a timing diagram of an example embodiment of dynamic distributed sidelink channel sensing.

Turning now to FIG. 3, the figure illustrates an example method 300 of distributed channel sensing by a user equipment 115A in a sidelink group that comprises UE 115A and UE 115B, which may function as a sidelink relay device. At act 305, UE115B transmits one or more current channel sensing configurations to UE115A. The channel sensing configurations transmitted at act 305 may comprise current distributed channel sensing configurations. At act 310, UE 115B transmits back to UE115A a proposed distributed channel sensing configuration, or proposed channel sensing configurations. The proposed distributed channel sensing configurations may take into account capabilities, battery charge level, or device type, for example, of other UE members of the side link group not shown in the figure. At act 315, UE115A transmits an acceptance of the proposed distributed channel sensing configurations to UE115B. At act 320, UE 115A overwrites, or disregards, previous channel sensing configurations, which may or may not be distributed channel sensing configurations, in favor of the proposed and accepted distributed channel sensing configuration, or configurations, proposed at act 310 and accepted at act 315. At act 325, UE115A monitors and blindly decodes the control channel, or instants of a part of the control channel, according to the accepted distributed channel configured sensing periods that are specific to UE 115A. While UE 115A is monitoring a decoding the control channel control channel instants, some or all of other UEs of the sidelink group may be in a deep sleep mode. The distributed channel configuration sensing periods that are specific to UE115A may be periods 205-1 and 205-2 shown in FIG. 2. Continuing with description of FIG. 3 at act 330 after the monitoring a decoding the configured distributed channel sensing opportunities that is/are configured specifically for UE115A, UE 115A may report any control channel information it retrieved during the monitoring and decoding performed at act 325 to sidelink relay UE 115B, or to other member UEs of the sidelink group and enter a deep sleep mode. If a negotiated distributed channel sensing validity period has expired UE115A may resume monitoring and blindly decoding channel sensing occasions at act 335 according to the previous channel sensing configuration that was overwritten, or disregarded, at act 320. It will be appreciated that the negotiated distributed channel sensing validity period may be, or may not be, distributed sensing periodicity 203 shown in FIG. 2.

Figure 4:
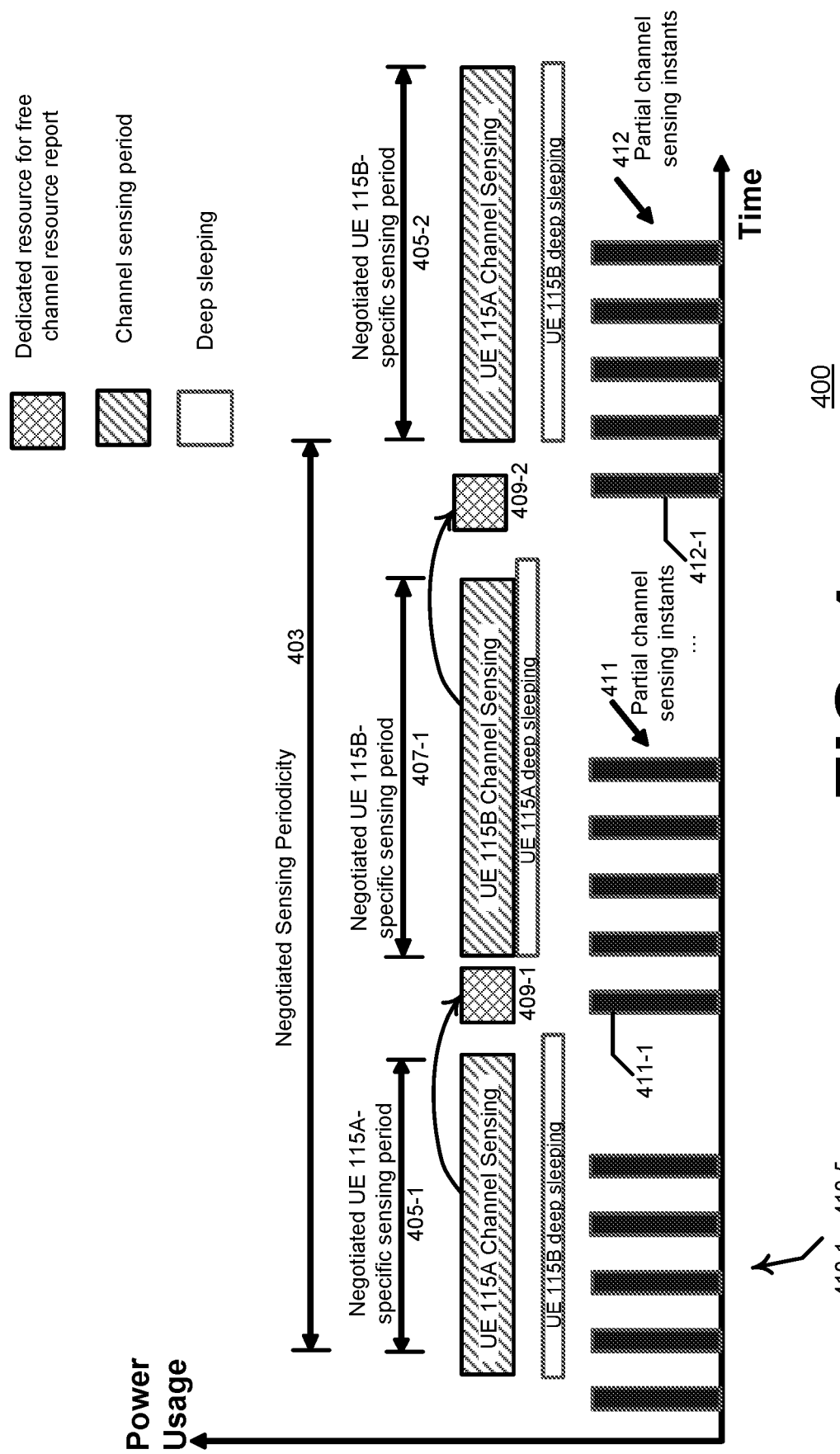
FIG. 4 illustrates a diagram of an example embodiment of dynamic distributed sidelink channel sensing with a free channel report reporting space.

Turning now to FIG. 4, the figure illustrates a diagram of an example embodiment 400 of Dynamic free channel resource report exchange. As discussed above in reference to FIGS. 2 and 3, when using dynamic distributed sidelink channel sensing, sidelink devices perform channel sensing in a distributed manner. At a given time/instant, a sidelink device may be performing channel sensing while other sidelink devices in proximity (e.g., of the same sidelink group, or sensing coordination zone) may be deep sleeping. Thus, those deep sleeping sidelink devices may not be aware of which resources are occupied, or scheduled, due to the lack of channel sensing over the period that the active sidelink device is monitoring. Accordingly, sidelink devices of a channel sensing coordination zone/group, may dynamically share free channel resource reports that they determine to maintain overall sidelink reliability. To facilitate such reporting, coordinating sidelink devices may be configured with reporting channel occasions and formats for transmitting and sharing of the free, or available, channel resource reports that they may generate. To transmit the free/available channel resource report, a dedicated channel resource 409 for report transmission may be used. A RAN node and/or sidelink relay may configure channel resource occasions, periodic or non-periodic, to carry the free channel resource report. Thus, a sidelink device, with an active distributed channel sensing period, may transmit during the first available channel occasion of the dedicated free channel report resource any free channel resource report information that it has compiled. As shown in FIG. 4, after negotiated UE 115A-specific distributed sensing period 405-1, free channel resource report information determined by, or compiled by, UE 115A may be transmitted according to a configurable scrambling code in dedicated free resource channel resource occasion 409-1. Compared to sensing periods 205-1 and 207-1 shown in FIG. 2, sensing periods 405-1 and 407-1 have been spread apart in FIG. 4 to show that neither UE 115A nor UE 115B is deep sleeping during first partial sensing instant/occasion 411-1 of what was part of sensing period 207-1 shown in FIG. 2. Similarly, as shown in FIG. 4, neither UE 115B nor UE 115A is asleep during the first monitoring instance 412-1 of what was part of period 205-2 in FIG. 2. Thus, a UE that has just finished its respective distributed channel sensing period 405-1 or 407-1 may stay awake long enough to transmit a free channel resource report in resource occasion space 409-1 or 409-2, respectively, after the UE has concluded its corresponding channel sensing period, and a UE corresponding to the next channel sensing period may wake up before its exclusive sensing period so that it can monitor a free channel resource report space 409 that precedes its respective distributed channel sensing period.

In an example embodiment, the free channel resource report may be scrambled using a WTRU/UE-specific (e.g., the active UE of the sidelink group that is performing the determining and transmitting of the report) code or code index. In another example embodiment, the free channel resource report can be scrambled using a group-common scrambling code, e.g., multicast scrambling code. Thus, the proximate sidelink group devices monitor and decode each channel occasion carrying the free channel resource report using either the group common scrambling code or the one or more of the WTRU-specific scrambling codes of WTRUs/devices with a recently expired distributed control channel sensing period. Thus, the dedicated channel resource(s) can simultaneously carry the free channel resource reports from multiple sensing devices, each using its own configured scrambling code. In another example embodiment, a dynamically scheduled resource for the free resource report may be dynamically scheduled as a regular sidelink data transmission-instead of data payload being transmitted on a control channel resource, the free channel resource report may be transmitted via the data channel resource. The sensing sidelink device may transmit first and a second stage SCIs to dynamically schedule the transmission of the compiled free channel resource report. This avoids having to allocate additional sidelink control channel resource overhead dedicated for report transmissions. However, it increases the latency from the moment the free channel resources are determined at the sensing device until the sensing device shares the determined free channel information with devices within the same coordination zone due to the dynamic scheduling and the variable resource availability. The scrambling code and/or destination identifier for the transmitted second stage SCI may be set to the configured group-common scrambling code and/or a destination identifier, (e.g., multicast destination identifier for devices that belong to the same sensing coordination zone).

Turning now to FIG. 5A, the figure illustrates example contents and structure of free channel resource report 501 reported in a free channel resource report space 409 described in reference to FIG. 4. Example free resource report 500 may comprise record entries 510 that that are associated with explicit or implicit free-channel information 515 of available/free channel resources, including any of the following information elements per each resource entry record 510: a free resource pattern index; a free resource starting time instant, symbol, subframe, slot, frame; a free resource frequency resources including frequency physical resource block (PRBs), sidelink subchannel index, and/or resource pool index; for one or more channel busy ratio ("CBR") values 517, calculated over each channel sensing period (e.g., one CBR entry per each free resource entry/record). CBR exchange may be used to share information regarding how 'busy' a sidelink channel is for sidelink devices in proximity, such that they can correctly adjust their transmissions over the signaled, or indicated, information in the free resource report according to current channel congestion conditions.

FIG. 5B illustrates information of an example free channel resource report 502 with record entries 520 associated with free channel information 525 information corresponding to a single filtered calculated CBR 527 over a sensing device's sensing period. This enables reducing the size of the transmitted free resources report. However, the exact filtering coefficients and filter types must be signaled and exchanged among coordinating sidelink devices of the same coordination zone to unify the devices' perspectives on the channel occupancy. In other words, UEs of a given sidelink group may coordinate among themselves to only provide reports of free/available resources that have a specified CBR 527 within configured tolerance criteria.

In an embodiment a WTRU/UE receives a free channel resource report configuration, which configuration may include a report format. A free channel resource report may include one or more resource entries, each indicating a free channel resource in the time and frequency domains, in one embodiment including one or more CBRs calculated and in another embodiment one or more report entries may be filtered for a specified CBR for one or more channel sensing periods. The UE may receive information of the channel resource report occasion, or instant, which may carry a transmitted free channel resource reports including timing and frequency resources and occasion periodicity. A UE transmitting a free channel resources report may transmit UE-specific scrambling code ID and/or index information corresponding to the free channel resource report to UEs in the current channel sensing coordination zone. If a current channel sensing period corresponding to the UE has expired, the UE may compile and transmit a free channel resource report over the next available configured reporting occasion, in an embodiment using the UE-specific scrambling code ID/index and the signaled channel report configurations and format.

Figure 6:
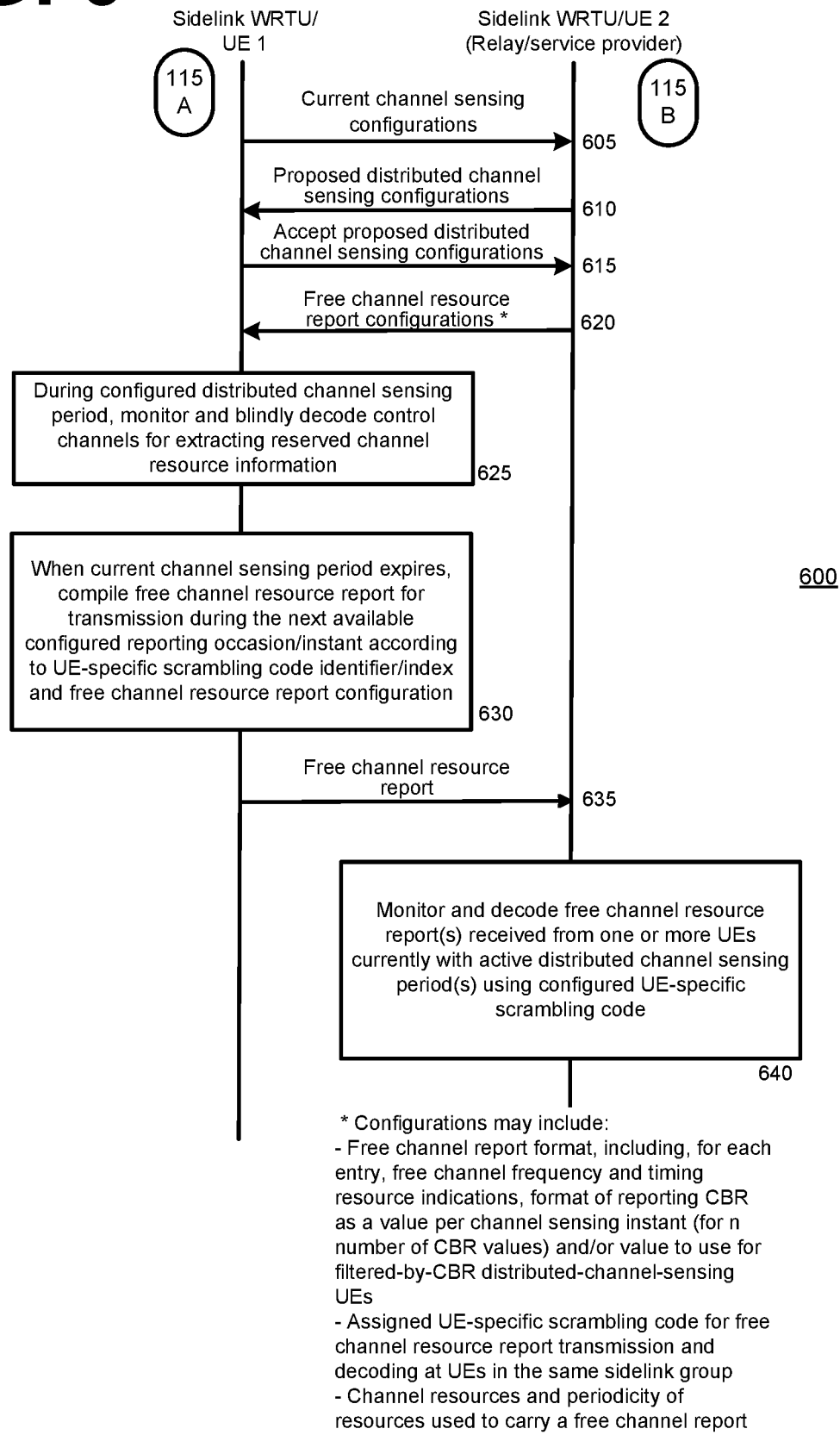
FIG. 6 illustrates a timing diagram of an example embodiment of dynamic distributed sidelink channel sensing with a free channel report reporting space.

Turning now to FIG. 6, the figure illustrates a timing diagram of an example method 600 to compile and transmit a free channel resource report during an available/free channel resource report occasion by a user equipment 115A in a sidelink group that comprises UE 115A and UE 115B, which may function as a sidelink relay device. At act 605, UE115B transmits one or more current channel sensing configurations to UE115A. The channel sensing configurations transmitted at act 605 may comprise current distributed channel sensing configurations. At act 610, UE 115B transmits back to UE115A a proposed distributed channel sensing configuration, or proposed channel sensing configurations. The proposed distributed channel sensing configurations may take into account capabilities, battery charge level, or device type, for example, of other UE members of the side link group not shown in the figure. At act 615, UE115A transmits an acceptance of the proposed distributed channel sensing configurations to UE115B. At act 620, UE 115B transmits to UE 115A free channel resource report configurations. The configuration transmitted at act 620 for providing a free/available channel resource report may comprise: a free channel report format, including, for each entry (e.g., an entry 510 or 520 as shown in FIG. 5A or 5B, respectively), format for free channel frequency and timing resource indications, format of reporting CBR as a value per channel sensing instant (for n number of CBR values) and/or a value to use for filtered-by-CBR distributed-channel-sensing UEs (e.g., as shown in FIG. 5B). The configuration transmitted at act 620 may also comprise an assigned UE-specific scrambling code for free channel resource report transmission and decoding at UEs in the same sidelink group, and channel resources and periodicity of resources used to carry a free channel report (e.g., periodicity 403, sensing periods 405 and 407, and instants 411-1 and 412-1 to use for transmitting the free resource reports, as shown in FIG. 4).

Continuing with description of FIG. 6 act 625 UE 115A monitors and blindly decodes control channel instants, such as instants 410-2-410-5 of channel sensing period 405-1 shown in FIG. 4. At act 630 of FIG. 6, when a current channel sensing period ends, such as channel sensing period 405-1 ending after instant 410-5 shown in FIG. 4, UE 115A may compile a free channel resource report of information, based at least partially on information obtained during monitoring of instants 401-2-402-5 according to formatting, scrambling codes, or other configuration information transmitted at act 620. UE 115A may transmit the free channel resource report at act 635 during available/free channel resource report occasion, such as occasion 409-1 shown in FIG. 4. UE 115B may wake up, monitor, and decode at act 640 the available/free channel resource report occasion and retrieve free channel resource report information contained therein according to the configured scrambling code that UE 115A used to transmit the report at act 635, or that was used by another UE to transmit free channel resource information during occasion 409-1 as shown in FIG. 4.

In an embodiment, a UE may receive a free channel resource report configuration where the report includes one or more resource entries/records each associated with free channel resource information in the time and frequency domains, one or more CBR values for the one or more entries/records calculated and/or filtered over the one or more previous channel sensing periods, and/or a channel sensing coordination group destination identifier/code (e.g., a multicast identifier). On condition that the current channel sensing period has expired, the UE may transmit first and second stage SCIs to schedule the transmission of the free channel resource report, with a destination device identifier set to the configured channel sensing coordination group destination identifier/code. The UE may transmit the free channel resource report on a data channel resource based on a transmission configuration corresponding to the transmission of the first and second stage SCI.

Figure 7:
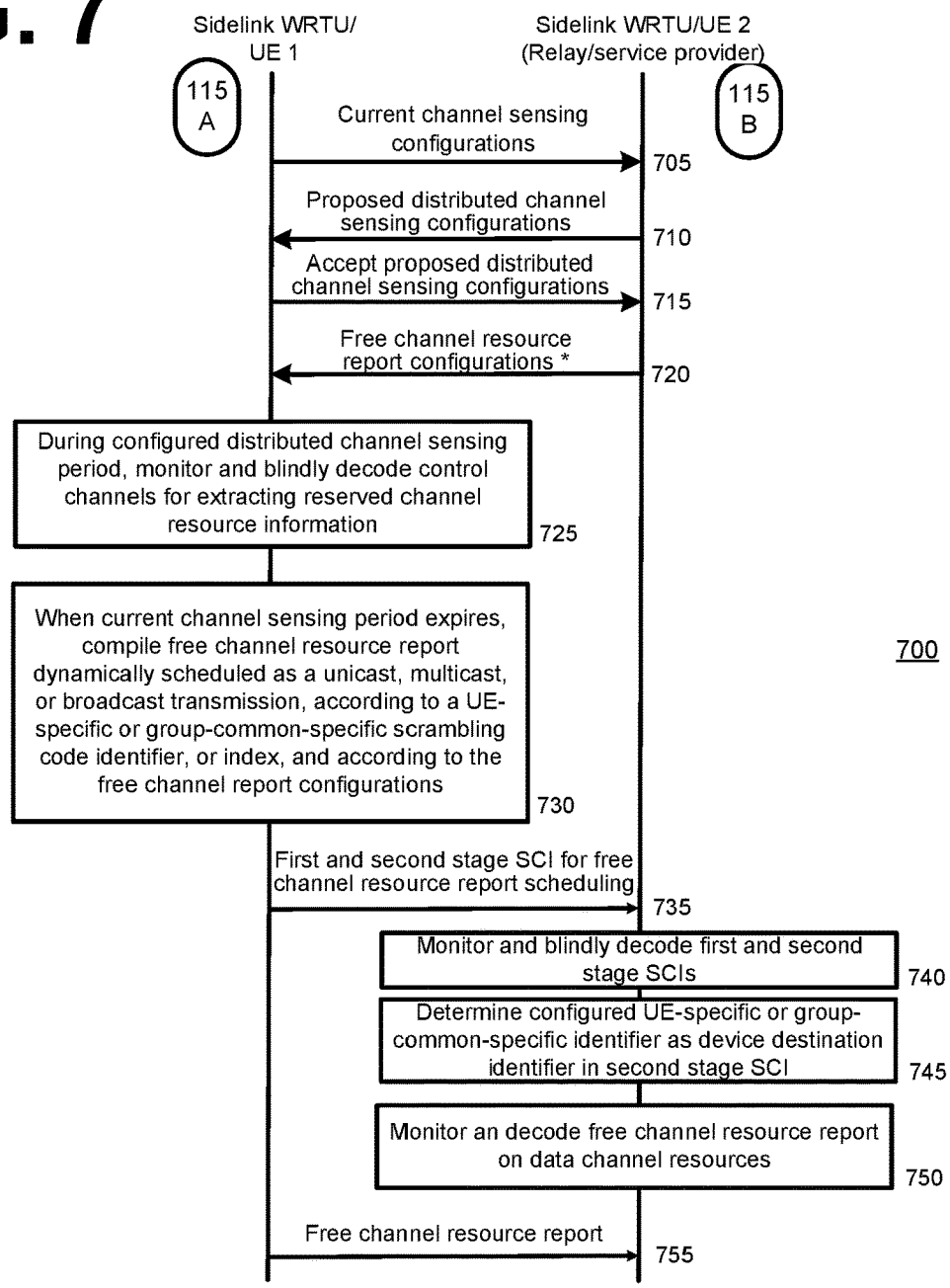
FIG. 7 illustrates a timing diagram of an example method 700 to compile and transmit a free channel resource report using a data channel resource.

Turning now to FIG. 7, the figure illustrates a timing diagram of an example method 700 to compile and transmit a free channel resource report using a data channel resource by a user equipment 115A in a sidelink group that comprises UE 115A and UE 115B, which may function as a sidelink relay device. At act 705, UE 115A transmits one or more current channel sensing configurations to UE 115B. The channel sensing configurations transmitted at act 705 may comprise current distributed channel sensing configurations. At act 710, UE 115B transmits back to UE115A a proposed distributed channel sensing configuration, or proposed channel sensing configurations. The proposed distributed channel sensing configurations may take into account capabilities, battery charge level, or device type, for example, of other UE members of the side link group not shown in the figure. At act 715, UE115A transmits an acceptance of the proposed distributed channel sensing configurations to UE115B. At act 720, UE 115B transmits to UE 115A free channel resource report configurations. The configuration transmitted at act 720 for providing a free channel resource report may comprise: a free channel report format, including, for each entry (e.g., an entry 510 or 520 as shown in FIG. 5A or 5B, respectively), format for free channel frequency and timing resource indications, format of reporting CBR as a value per channel sensing instant (for n number of CBR values) and/or a value to use for filtered-by-CBR distributed-channel-sensing UEs (e.g., as shown in FIG. 5B). The configuration transmitted at act 720 may also comprise an indication to schedule transmission of a free channel resource report using a group-common destination identifier associated with the sidelink group, and the configuration information transmitted at act 720 may comprise channel resources and periodicity of resources used to carry a free channel report.

Continuing with description of FIG. 7, at act 725, UE 115A monitors and blindly decodes control channel instants, such as instants 410-2-410-5 of channel sensing period 405-1 shown in FIG. 4. At act 730, of FIG., when a current channel sensing period ends, such as channel sensing period 405-1 ending after instant 410-5 shown in FIG. 4, UE 115A compiles a free channel resource report of information, based at least partially on information obtained during monitoring of instants 401-2-402-5 according to formatting, scrambling codes, and other configuration information transmitted at act 720. The report compiled at act 730 is prepared for transmission according to a UE-specific scrambling code or according to a group-common-specific scrambling code identifier, or index.

At act 735, UE 115A transmits first a second stage SCIs to notify UE 115B, or another member of the sidelink group of which UEs 115A and 115B may be a part, of scheduling of the free channel resource report. UE 115B monitors and blindly decodes at act 740 the first and second stage SCIs. From the decoded second stage SCI, UE 115B at act 745 determines the configured UE-specific or group-common-specific identifier as a device destination identifier. At act 750, UE 115B monitors a data channel, or a control channel, according to the device destination identifier determined at act 745 and receives and decodes at act 750 free channel resource report that UE 115A may send at act 755. (It will be appreciated that the ordering of acts 750 and 755 is shown for purposes of example but may occur in reverse order relative to the ordering shown in FIG. 7, or acts 750 and 755 may be performed substantially simultaneously.) As discussed above, embodiments discussed in reference to FIG. 2-FIG. 7 may enable a dynamic distributed channel sensing procedure among sidelink devices of a sidelink group having various device battery capabilities and/or other conditions and should not negatively impact reliability of the sidelink interface due to timely sharing of determined free channel resource reports. However, it is possible that a sidelink interface may be specified to support ultra-reliable and low latency communication. ccordingly, a sidelink interface should support extremely low latency communications for different types of sidelink devices. In case a latency stringent packet arrives at a sidelink device that does not have an active channel sensing period, the sidelink device buffers the arriving payload until it performs sidelink channel sensing determines free sidelink resources. Then the sidelink device may initiate scheduling of the sidelink payload, but the buffering and waiting to determine a free/available sidelink resource may result in a violation of a stringent latency budget associated with the sidelink traffic.

An example embodiment enables sidelink devices that are not currently performing distributed channel sensing to dynamically request an immediate (or almost immediate) partial free channel resource report from the one or more sidelink device in proximity that are currently performing sensing of the sidelink control channel. Thus, sidelink devices may avoid buffering delay in waiting until proximate sidelink devices finish their configured sensing period and transmit a full free channel resource report.

The transmitted partial free channel resource report request can be scrambled with the one or more of the scrambling codes or sequences of the sidelink devices that have active and ongoing channel sensing periods. In another option a partial free channel resource report can be destined to a multi cast destination identifier, if such request is dynamically scheduled, and to which sensing devices should each respond with respective partial free channel resource reports. Partial free channel resource reports may be scrambled according to a WTRU-specific and/or group-common scrambling code, based on received configurations. A sidelink device requesting a partial free channel resource report may accordingly attempt decoding received partial reports using each of the WTRU-specific and/or group-common scrambling code to extract free channel resource information from the one or more received partial free channel resource reports. Partial free channel reports can be transmitted over dedicated configured channel occasions or dynamically scheduled and included as a new information element of a second stage SCI and/or dynamically scheduled and transmitted as the data payload over the sidelink data channels.

In an embodiment, sidelink WTRU/UEs may receive configurations for making interruption free channel resource report requests, including the channel time and frequency resources and periodicity information for transmitting a request. On condition that latency-stringent sidelink payload arrives at a UE during a configured channel sensing skipping period (e.g., the UE is not currently sensing channel resources), the UE transmits an interruption free channel resource report request, during a next available interruption channel occasion, towards a UE currently performing channel sensing during its configured channel sensing period. The interruption request can be configured to be scrambled by the destination UE's device-specific, and/or multicast scrambling code/sequence. A UE receiving the interruption request may decode the interruption request and substantially immediately prepare and transmit a partial free channel resource report, either dynamically or statically scheduled on control and/or data sidelink channel resources.

In an embodiment, sidelink UEs may receive configurations for interruption free channel resource report requests, including the channel time and frequency resources and periodicity information for transmitting a request. On condition of latency-stringent sidelink payload arriving at a UE during a configured channel sensing skipping period of the UE, the UE may transmit a first and a second stage SCI, which may carry an interruption free channel resource report request towards a UE with a currently active channel sensing period. The active UE may receive and decode the request and may substantially immediately generate and transmit a partial free channel resource report, either dynamically or statically scheduled and transmitted on control and/or data sidelink channel resources.

Figure 8:
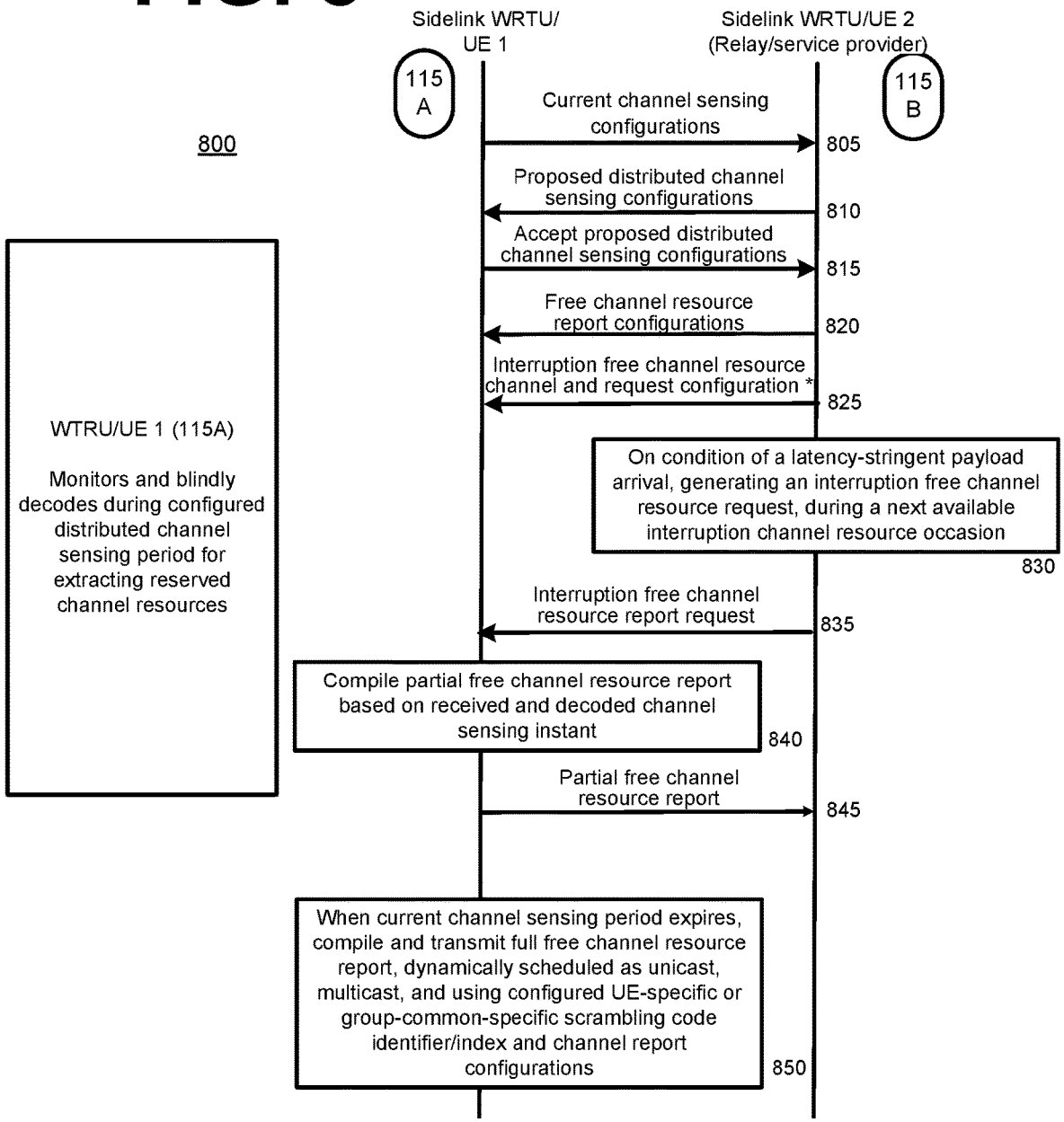
FIG. 8 illustrates a timing diagram of an example method 800 to compile and transmit a partial free channel resource report.

Turning now to FIG. 8, the figure illustrates a timing diagram of an example method 800 to compile and transmit a partial free channel resource report in response to a interruption request received according to a distributed channel sensing period partial report occasion configured for communicating partial free channel resource reports among members of a sidelink group that comprises UE 115A and UE 115B, which may function as a sidelink relay device.

The distributed channel sensing period partial report occasion may be referred to as an interruption resource report request occasion.

At act 805, UE115B transmits one or more current channel sensing configurations to UE115A. The channel sensing configurations transmitted at act 805 may comprise current distributed channel sensing configurations. At act 810, UE 115B transmits back to UE115A a proposed distributed channel sensing configuration, or proposed channel sensing configurations. The proposed distributed channel sensing configurations may take into account capabilities, battery charge level, or device type, for example, of other UE members of the side link group not shown in the figure. At act 815, UE115A transmits an acceptance of the proposed distributed channel sensing configurations to UE115B. At act 820, UE 115B transmits to UE 115A free channel resource report configurations. The configuration transmitted at act 820 for providing a free channel resource report may comprise: a free channel report format, including, for each entry (e.g., an entry 510 or 520 as shown in FIG. 5A or 5B, respectively), format for free channel frequency and timing resource indications, format of reporting CBR as a value per channel sensing instant (for n number of CBR values) and/or a value to use for filtered-by-CBR distributed-channel-sensing UEs (e.g., as shown in FIG. 5B). The configuration transmitted at act 820 may also comprise an indication to schedule transmission of a free channel resource report using a group-common destination identifier associated with the sidelink group, and the configuration information transmitted at act 820 may comprise channel resources and periodicity of resources used to carry a free channel report.

At act 825, UE 115B transmits to UE 115A an interruption free channel resource report request configuration, that may comprise channel timing for interruption free channel resource report request occasions, or frequency for carrying interruption/preemption free channel resource report requests. The configuration transmitted at act 825 may comprise scrambling information for interruption free channel resource report requests as any of: multicast ID associated with sidelink group/zone or one or more UE-specific scrambling codes. At act 830, if a latency-stringent payload arrives at UE 115B, the UE generates an interruption free channel resource request, during a next available configured interruption free channel resource report request occasion and the UE transmits the request during the configured interruption channel resource report request occasion at act 835 for devices of the sidelink group to communicate interruption requests for partial free channel resource reports at act. At act 840, UE 115A compiles a partial free channel resource report based on channel resource information that UE 115A may have received during an active channel sensing period corresponding to UE 115A and transmits the partial free channel resource report at act 845. UE 115B may receive the partial free channel resource report and may use information contained therein to transmit the latency-stringent traffic received at 830 to a UE to which the latency-stringent traffic is intended. At act 850, after a channel sensing period corresponding to UE 115A expires, UE 115A may transmit a full free channel resource report according to other embodiments disclosed herein.

Figure 9:
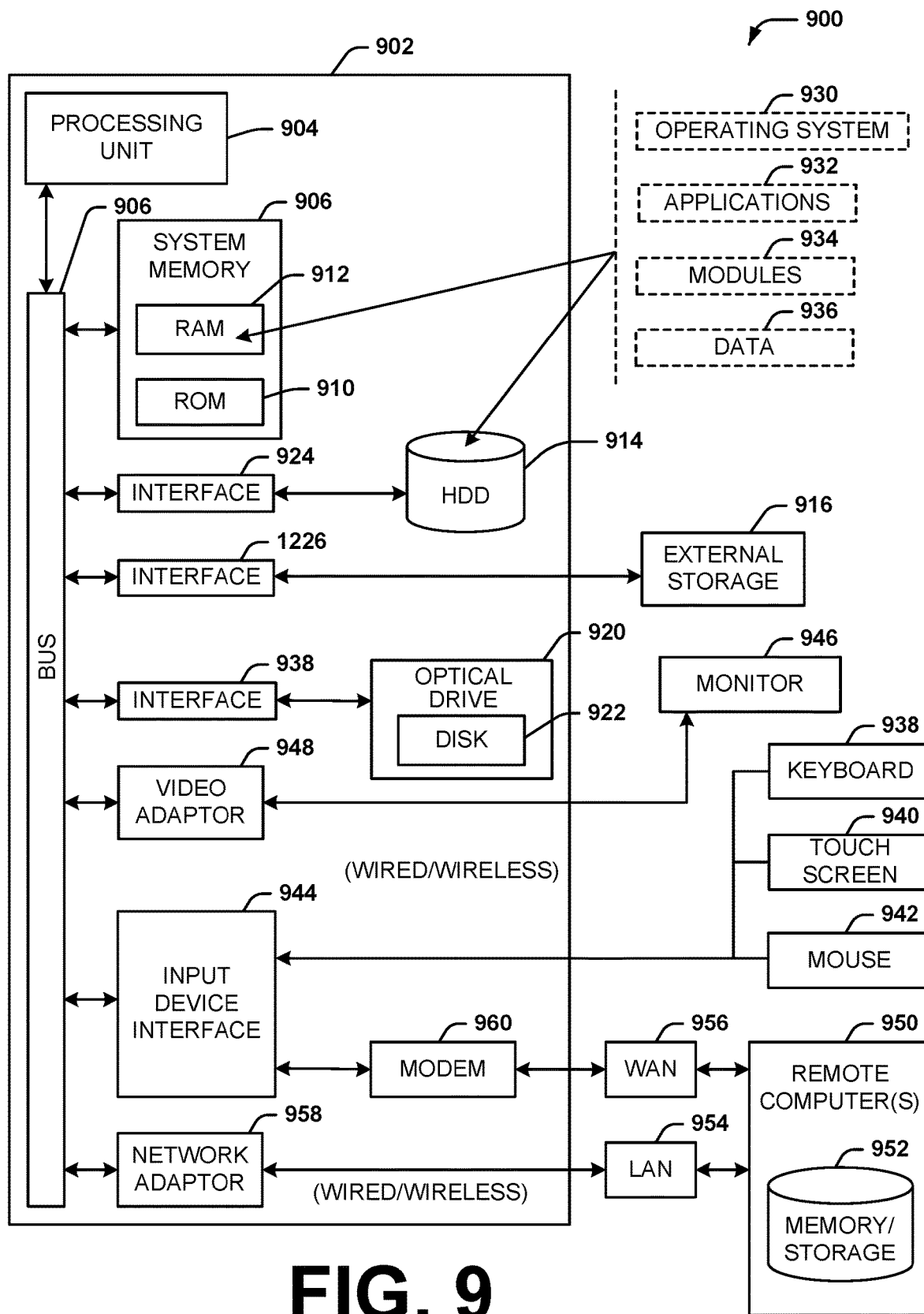
FIG. 9 illustrates an example computer environment.

In order to provide additional context for various embodiments described herein, FIG. 9 and the following discussion are intended to provide a brief, general description of a suitable computing environment 900 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors and may include a cache memory. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

Computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can comprise a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are example and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
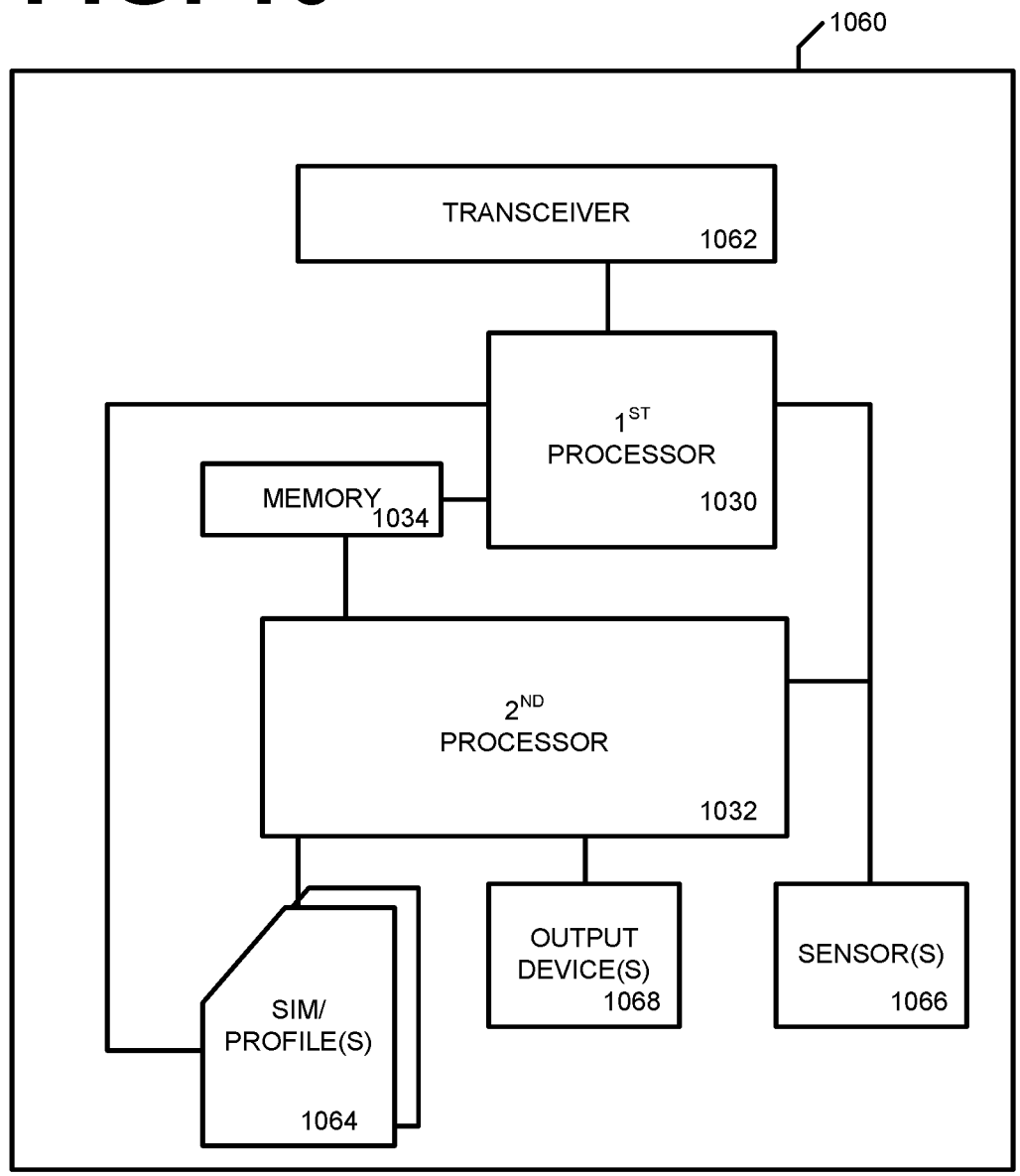
FIG. 10 illustrates a block diagram of an example wireless UE.

Turning to FIG. 10, the figure illustrates a block diagram of an example UE 1060. UE 1060 may comprise a smart phone, a wireless tablet, a laptop computer with wireless capability, a wearable device, a machine device that may facilitate vehicle telematics, and the like. UE 1060 comprises a first processor 1030, a second processor 1032, and a shared memory 1034. UE 1060 includes radio front end circuitry 1062, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1062 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 10, UE 1060 may also include a SIM 1064, or a SIM profile, which may comprise information stored in a memory (memory 34 or a separate memory portion), for facilitating wireless communication with RAN 105 or core network 130 shown in FIG. 1. FIG. 10 shows SIM 1064 as a single component in the shape of a conventional SIM card, but it will be appreciated that SIM 1064 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1064 and another device, which may be a component of RAN 105 or core network 130 shown in FIG. 1). A SIM profile 1064 may also comprise identifying information that is unique to the SIM, or SIM profile, such as, for example, an International Mobile Subscriber Identity ("IMSI") or information that may make up an IMSI.

SIM 1064 is shown coupled to both the first processor portion 1030 and the second processor portion 1032. Such an implementation may provide an advantage that first processor portion 30 may not need to request or receive information or data from SIM 1064 that second processor 1032 may request, thus eliminating the use of the first processor acting as a 'go-between' when the second processor uses information from the SIM in performing its functions and in executing applications. First processor 1030, which may be a modem processor or baseband processor, is shown smaller than processor 1032, which may be a more sophisticated application processor, to visually indicate the relative levels of sophistication (i.e., processing capability and performance) and corresponding relative levels of operating power consumption levels between the two processor portions. Keeping the second processor portion 1032 asleep/inactive/in a low power state when UE 1060 does not request (or invoke or need) it for executing applications and processing data related to an application provides an advantage of reducing power consumption when the UE only requests (or needs) to use the first processor portion 1030 while in listening mode for monitoring routine configured bearer management and mobility management/maintenance procedures, or for monitoring search spaces that the UE has been configured to monitor while the second processor portion remains inactive/asleep.

UE 1060 may also include sensors 1066, such as, for example, temperature sensors, accelerometers, gyroscopes, barometers, moisture sensors, and the like that may provide signals to the first processor 1030 or second processor 1032. Output devices 1068 may comprise, for example, one or more visual displays (e.g., computer monitors, VR appliances, and the like), acoustic transducers, such as speakers or microphones, vibration components, and the like. Output devices 1068 may comprise software that interfaces with output devices, for example, visual displays, speakers, microphones, touch sensation devices, smell or taste devices, and the like, that are external to UE 1060.

Figure 11:
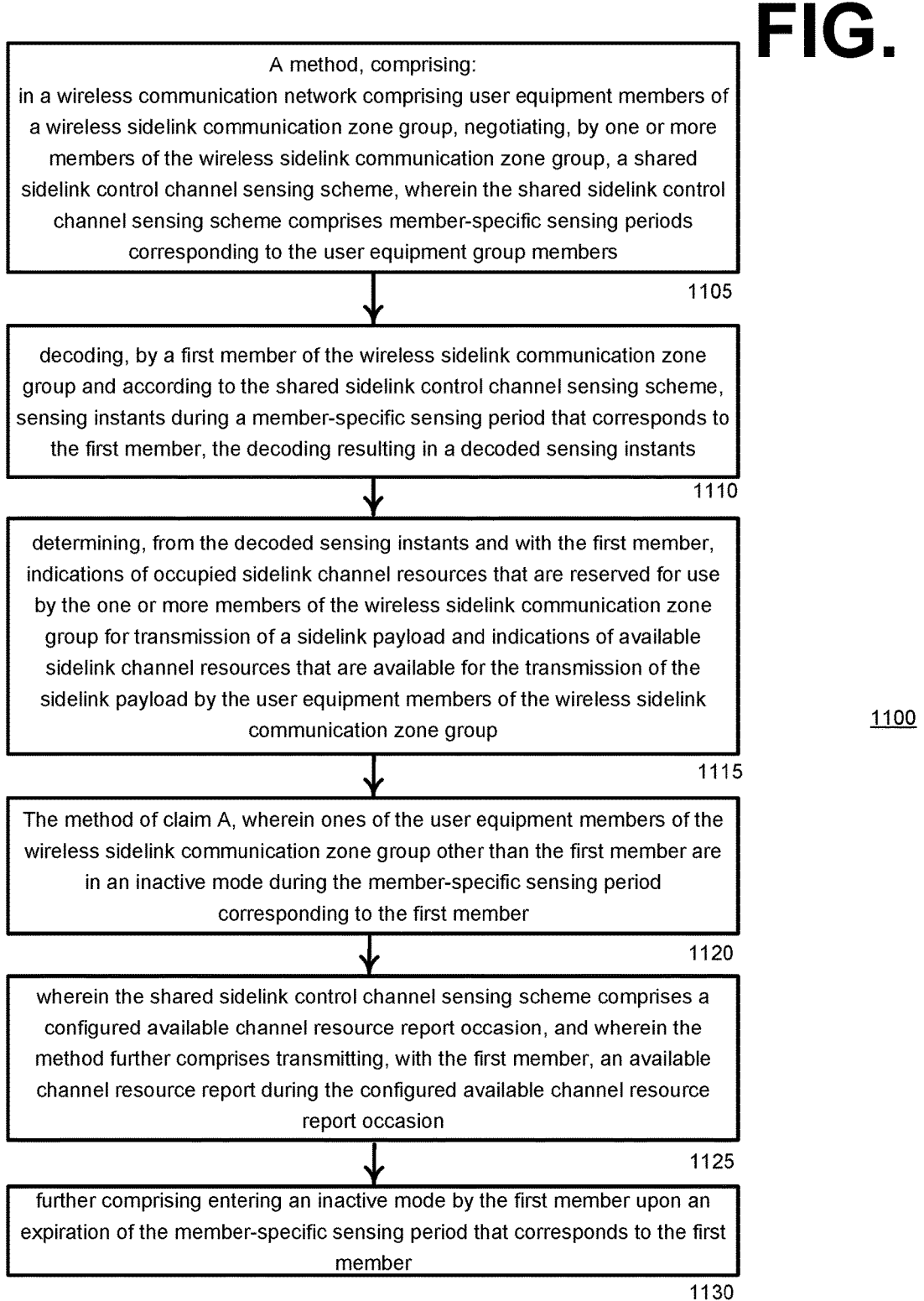
FIG. 11 illustrates a block diagram of an example method.

Turning now to FIG. 11, the figure illustrates an example embodiment method 1100 comprising at block 1105 in a wireless communication network comprising user equipment members of a wireless sidelink communication zone group, negotiating, by one or more members of the wireless sidelink communication zone group, a shared sidelink control channel sensing scheme, wherein the shared sidelink control channel sensing scheme comprises member-specific sensing periods corresponding to the user equipment group members; at block 1110 decoding, by a first member of the wireless sidelink communication zone group and according to the shared sidelink control channel sensing scheme, sensing instants during a member-specific sensing period that corresponds to the first member, the decoding resulting in a decoded sensing instants; at block 1115 determining, from the decoded sensing instants and with the first member, indications of occupied sidelink channel resources that are reserved for use by the one or more members of the wireless sidelink communication zone group for transmission of a sidelink payload and indications of available sidelink channel resources that are available for the transmission of the sidelink payload by the user equipment members of the wireless sidelink communication zone group; at block 1120 The method of claim A, wherein ones of the user equipment members of the wireless sidelink communication zone group other than the first member are in an inactive mode during the member-specific sensing period corresponding to the first member; at block 1125 wherein the shared sidelink control channel sensing scheme comprises a configured available channel resource report occasion, and wherein the method further comprises transmitting, with the first member, an available channel resource report during the configured available channel resource report occasion; and at block 1130 further comprising entering an inactive mode by the first member upon an expiration of the member-specific sensing period that corresponds to the first member.

Figure 12:
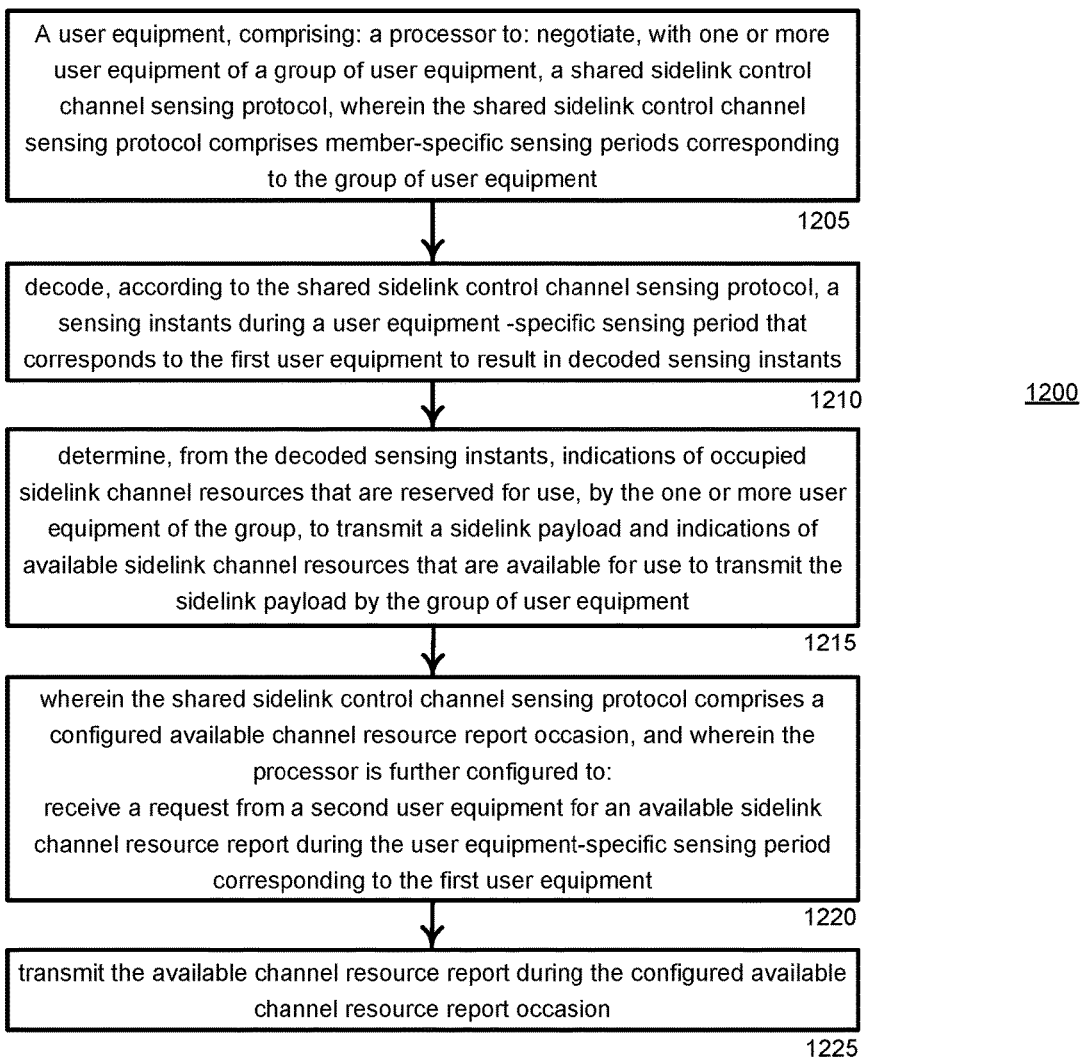
FIG. 12 illustrates a block diagram of an example user equipment.

Turning now to FIG. 12, the figure illustrates an example user equipment 1200 comprising at block 1205 a processor to: negotiate, with one or more user equipment of a group of user equipment, a shared sidelink control channel sensing protocol, wherein the shared sidelink control channel sensing protocol comprises member-specific sensing periods corresponding to the group of user equipment; at block 1210 decode, according to the shared sidelink control channel sensing protocol, a sensing instants during a user equipment-specific sensing period that corresponds to the first user equipment to result in decoded sensing instants; at block 1215 determine, from the decoded sensing instants, indications of occupied sidelink channel resources that are reserved for use, by the one or more user equipment of the group, to transmit a sidelink payload and indications of available sidelink channel resources that are available for use to transmit the sidelink payload by the group of user equipment; at block 1220 wherein the shared sidelink control channel sensing protocol comprises a configured available channel resource report occasion, and wherein the processor is further configured to: receive a request from a second user equipment for an available sidelink channel resource report during the user equipment-specific sensing period corresponding to the first user equipment; and at block 1225 transmit the available channel resource report during the configured available channel resource report occasion.

Turning now to FIG. 13, the figure illustrates a non-transitory machine-readable medium 1300 comprising at block 1305 executable instructions that, when executed by a processor of a first user equipment of a wireless sidelink communication zone group of user equipment in a wireless communication network, facilitate performance of operations, comprising: negotiating, by at least one user equipment of the wireless sidelink communication zone group, a shared sidelink control channel sensing procedure, wherein the shared sidelink control channel sensing procedure comprises implementing user equipment-specific sensing periods corresponding to the wireless sidelink communication zone group of user equipment; at block 1310 decoding, by the first user equipment of the wireless sidelink communication zone group and according to the shared sidelink control channel sensing procedure, sensing instants during a user equipment-specific sensing period that corresponds to the first user equipment to result in decoded sensing instants; at block 1315 determining, from the decoded sensing instants and with the first user equipment, indications of occupied sidelink channel resources that are reserved for use by the at least one user equipment of the wireless sidelink communication zone group for transmitting a sidelink payload and indications of available sidelink channel resources that are available for transmitting the sidelink payload by the user equipment s of the wireless sidelink communication zone group; at block 1320 wherein the operations further comprise receiving, with the first user equipment, a request from a second user equipment for an available sidelink channel resource report during the user equipment-specific sensing period corresponding to the first user equipment; and at block 1325 wherein the shared sidelink control channel sensing procedure comprises a configured available channel resource report occasion, and wherein the operations further comprise transmitting, with the first user equipment, the available channel resource report during the configured available channel resource report occasion.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |
| SCI | Sidelink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   in a wireless communication network comprising user equipment members of a wireless sidelink communication zone group, negotiating, by one or more members of the wireless sidelink communication zone group, a shared sidelink control channel sensing scheme, wherein the shared sidelink control channel sensing scheme comprises member-specific sensing periods corresponding to the user equipment group members;
   decoding, by a first member of the wireless sidelink communication zone group and according to the shared sidelink control channel sensing scheme, sensing instants during a member-specific sensing period that corresponds to the first member, the decoding resulting in decoded sensing instants;
   determining, from the decoded sensing instants and with the first member, indications of occupied sidelink channel resources that are reserved for use by the one or more members of the wireless sidelink communication zone group for transmission of a sidelink payload and indications of available sidelink channel resources that are available for the transmission of the sidelink payload by the user equipment members of the wireless sidelink communication zone group; and
   transmitting, by the first member, an available channel resource report during a configured available channel resource report occasion,
   wherein one or more other members of the wireless sidelink communication zone group, other than the first member, are in a deep sleep state during the member-specific sensing period that corresponds to the first member, and wherein the available channel resource report occasion occurs outside of one or more sensing periods that correspond to the one or more other members of the wireless sidelink communication zone group.

2. The method of claim 1, further comprising transmitting, with the first member, payload data corresponding to the first member using an available sidelink channel resource.

3. The method of claim 1, wherein ones of the user equipment members of the wireless sidelink communication zone group other than the first member are in an inactive mode during the member-specific sensing period corresponding to the first member.

4. The method of claim 1, wherein the shared sidelink control channel sensing scheme comprises the configured available channel resource report occasion.

5. The method of claim 1, further comprising transmitting, with the first member, an available channel resource report as payload data of a sidelink transmission.

6. The method of claim 1, further comprising receiving, with the first member, a request from a second member for an available sidelink channel resource report during the member-specific sensing period corresponding to the first member.

7. The method of claim 6, further comprising transmitting, with the first member, the available channel resource report as payload data of a sidelink transmission.

8. The method of claim 1, further comprising entering an inactive mode by the first member upon an expiration of the member-specific sensing period that corresponds to the first member.

9. The method of claim 1, wherein the negotiation is based on at least one battery charge level corresponding to at least one of the one or more members of the wireless sidelink communication zone group.

10. A sensing user equipment, comprising:
a processor to:
negotiate, with one or more user equipment of a group of user equipment, a shared sidelink control channel sensing protocol, wherein the shared sidelink control channel sensing protocol comprises member-specific sensing periods corresponding to user equipment of the group of user equipment;
decode, according to the shared sidelink control channel sensing protocol, sensing instants during a user equipment-specific sensing period that corresponds to the sensing user equipment to result in decoded sensing instants;
determine, from the decoded sensing instants, indications of occupied sidelink channel resources that are reserved for use, by the one or more user equipment of the group, to transmit a sidelink payload and indications of available sidelink channel resources that are available for use to transmit the sidelink payload by the group of user equipment; and
transmit an available channel resource report during a configured available channel resource report occasion, wherein other user equipment of the group of user equipment, other than the sensing user equipment, are in an inactive mode during the member-specific sensing period that corresponds to the sensing user equipment member, and wherein the available channel resource report occasion does not occur during periods that correspond to the other user equipment of the group of user equipment.

11. The sensing user equipment of claim 10, wherein the processor is further configured to transmit payload data corresponding to the sensing user equipment using an available sidelink channel resource.

12. The sensing user equipment of claim 10, wherein the shared sidelink control channel sensing protocol comprises the configured available channel resource report occasion.

13. The sensing user equipment of claim 10, wherein the processor is further configured to transmit an available channel resource report as payload data of a sidelink transmission.

14. The sensing user equipment of claim 10, wherein the shared sidelink control channel sensing protocol comprises a configured available channel resource report occasion, wherein the sensing user equipment is a first user equipment, and wherein the processor is further configured to:
receive a request from a second user equipment for an available sidelink channel resource report during the user equipment-specific sensing period corresponding to the first user equipment.

15. The sensing user equipment of claim 10, wherein the shared sidelink control channel sensing protocol negotiation is based on at least one battery charge level corresponding to at least one of the user equipment of the group of user equipment.

16. A non-transitory machine-readable medium, comprising executable instructions that, when executed by a processor of a first user equipment of a wireless sidelink communication zone group of user equipment in a wireless communication network, facilitate performance of operations, comprising:
negotiating, with at least one user equipment of the wireless sidelink communication zone group, a shared sidelink control channel sensing procedure, wherein the shared sidelink control channel sensing procedure comprises implementing user equipment-specific sensing periods corresponding to the wireless sidelink communication zone group of user equipment;
decoding, according to the shared sidelink control channel sensing procedure, sensing instants during a user equipment-specific sensing period that corresponds to the first user equipment to result in decoded sensing instants;
determining, from the decoded sensing instants, indications of occupied sidelink channel resources that are reserved for use by the at least one user equipment of the wireless sidelink communication zone group for transmitting a sidelink payload and indications of available sidelink channel resources that are available for transmitting the sidelink payload by the user equipment of the wireless sidelink communication zone group; and
transmitting an available channel resource report during a configured available channel resource report occasion, wherein other user equipment of the wireless sidelink communication zone group, other than the first user equipment, are in a deep sleep mode during the user equipment-specific sensing period that corresponds to the sensing user equipment member, and wherein the available channel resource report occasion does not occur during periods that correspond to the other user equipment of the wireless sidelink communication zone group.

17. The non-transitory machine-readable medium of claim 16, wherein the operations further comprise sleeping, during another user equipment-specific sensing period corresponding to another user equipment of the wireless sidelink communication zone group other than the first user equipment.

18. The non-transitory machine-readable medium of claim 16, wherein the shared sidelink control channel sensing procedure comprises the configured available channel resource report occasion.

19. The non-transitory machine-readable medium of claim 16, wherein the operations further comprise receiving, with the first user equipment, a request from a second user equipment for an available sidelink channel resource report during the user equipment-specific sensing period corresponding to the first user equipment.

20. The non-transitory machine-readable medium of claim 16, wherein the shared sidelink control channel sensing procedure is based on at least one battery charge level corresponding to at least one of the user equipment of the group of user equipment.

* * * * *